INVENTOR
JOHN D. FALK
BY
Marvin Bressler
ATTORNEY

United States Patent Office 3,706,631
Patented Dec. 19, 1972

3,706,631
STERILIZATION OF PROTEIN-CONTAINING FLUIDS
John D. Falk, 601 Grove Ave., Corning, Iowa 50841
Filed Oct. 8, 1970, Ser. No. 79,162
Int. Cl. A61k *23/02*
U.S. Cl. 195—1.8
37 Claims

ABSTRACT OF THE DISCLOSURE

A process for sterilization of a fluid which contains protein constituents, without coagulating said protein constituents, and the resultant product. The salts in said fluid are reduced which lowers the pH of the fluid. The fluid is pH adjusted with a basic solution, following which the fluid is sterilized by exposing the fluid to an energy source which raises the temperature of the fluid to the sterilizing temperature range for that fluid.

BACKGROUND OF THE DISCLOSURE

The instant invention is directed to a process for sterilizing materials which include protein constituents. More specifically, the instant invention is directed to a process for sterilizing material including protein constituents without coagulating the protein constituents contained therein. Most specifically, the instant invention is directed to a process for sterilizing material including protein constituents by reduction of the salts contained therein prior to sterilizing said material, so that the protein constituents are not coagulated during sterilization.

In the prior art, many methods have been advanced for sterilizing protein-containing materials. These methods are generally characterized by high heating steps to destroy any microorganisms present in the material. However, at the elevated temperatures required, not only are the microorganisms destroyed, but the protein contained in the material is coagulated. In the prior art methods, such coagulation has had no adverse effect since the sterilized materials are generally foods. These foods are generally used for human consumption, so that unless the food takes on an unpleasant taste, appearance, or odor, such as in the case of milk, there is no adverse effect on the consumer of such food.

The prior art method, however, cannot be used in a process in which the sterilized protein-containing material is to be employed as a nutrient to living cells. A living cell cannot subsist on coagulated protein. Thus, the prior art does not provide a method for sterilizing protein-containing materials which are to be used for tissue culturing and in other similar biological experimentation.

A copending application U.S. Ser. No. 730,854, now U.S. Pat. No. 3,579,631, assigned to the common assignee, is directed to another process for sterilizing materials containing protein. The copending application, although providing significant improvements over the prior art methods discussed above, in that a method is disclosed in which protein containing material is sterilized without coagulation of the protein, has certain disadvantages which are overcome in the instant application. In the copending application the protein-containing material is diluted with water prior to sterilization. This dilution step prevents protein coagulation. However, the dilution step in the method of the copending application is expensive. It adds considerable cost to the sterilization step in that the sensible and latent heat load is increased significantly.

BRIEF SUMMARY OF THE INVENTION

The instant invention is directed to a method for sterilizing material including protein constituents without coagulating said protein constituents nor increasing the heat load during sterilization. Thus, the process of the instant invention results in a sterilized, non-coagulated protein-containing material which may be employed in many biological applications.

In accordance with the instant invention, a process for sterilizing material which includes protein constituents is provided. The material which is processed in fluid form, includes the step of removing the bulk of the salts contained in the fluid. This has the effect of lowering the ionic conductivity of the fluid while, at the same time, increasing the fluid's acidity. The fluid is pH adjusted by the addition of a basic solution which increases the pH of the fluid without significantly increasing its ionic conductivity. The fluid is thereafter sterilized without coagulating the protein constituents contained therein.

The step of sterilization may be accomplished by exposing the fluid to microwave energy, by exposing the fluid to high pressure, high temperature water, or by exposing the fluid to high pressure superheated steam.

BRIEF DESCRIPTION OF THE DRAWINGS

The instant invention may be better understood by reference to the accompanying drawings of which.

DETAILED DESCRIPTION

Figure 1:
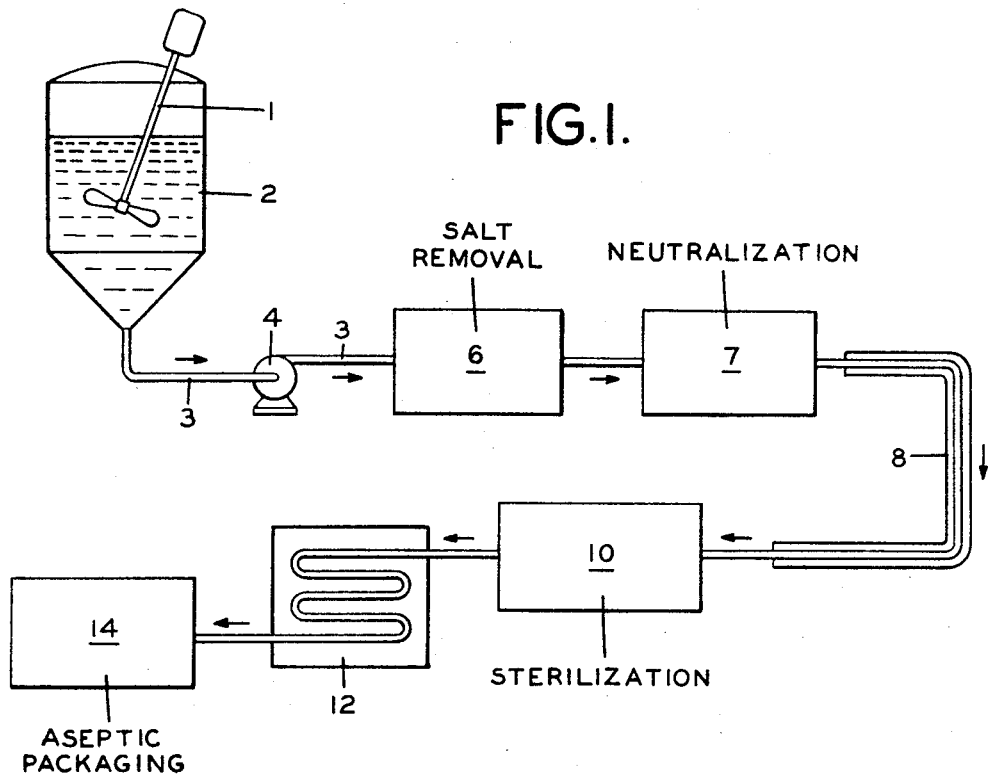
FIG. 1 is a flow diagram of a preferred embodiment of the method of the instant invention.

A preferred embodiment of the instant invention is illustrated in FIG. 1. FIG. 1 depicts a process for sterilization of a protein-containing fluid. The fluid which includes at least one protein constituent is disposed in a mixing tank 2 provided with a stirrer 1. In a preferred embodiment, the fluid is animal blood serum. In this regard, it should be appreciated that animal blood serum includes human blood serum. Blood serum comprises all of the constituents of animal blood except for the red cells and clotting agents. The fluid is stirred, in order to maintain uniform consistency. The fluid is pumped, by means of a pump 4, through a conduit 3 to a salt removal means 6.

Figure 2:
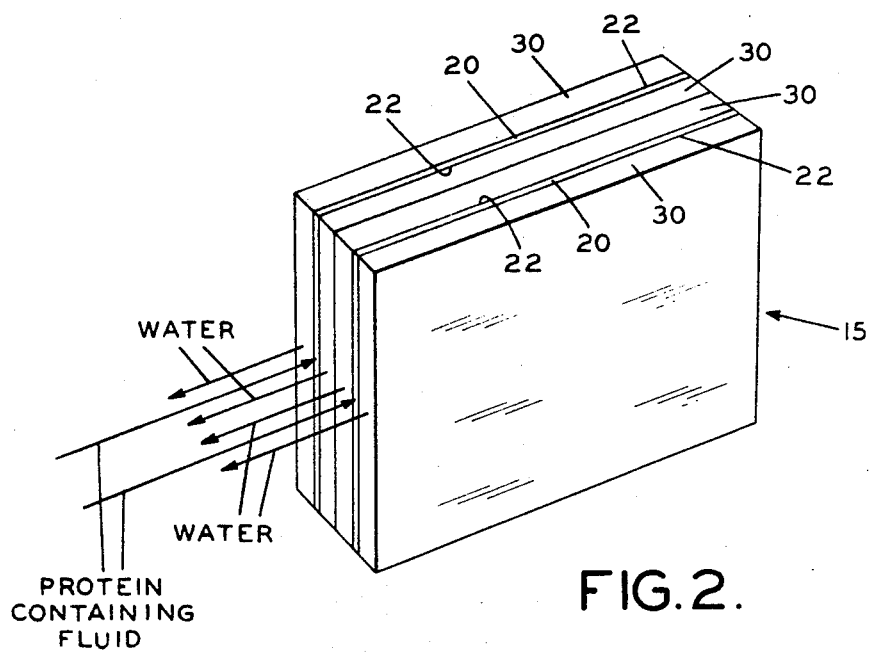
FIG. 2 is a schematic illustration of a preferred method of salt removal according to the instant invention.

FIG. 2 is a schematic illustration of a preferred salt removing means employed for salt removal in the process of the instant invention. In this preferred embodiment, the salt removing means constitutes a dialysis unit 16. The unit 16, constitutes two dialysis cells in parallel. It should be appreciated that other configurations in series and parallel may alternately be employed. In the typical unit illustrated in FIG. 2, the protein containing fluid flows through a narrow channel 20. Channel 20 is surrounded on both sides by two wider channels 30. In each channel 30, distilled water flows countercurrently to the flow of the protein-containing fluid. Channels 20 and 30 are separated by a porous membrane 22. Any porous material which permits the flow of ions across the membrane 22, through the membrane pores, can be used for this purpose. In the typical dialysis unit 16, much of the salts contained in the protein-containing fluid is removed therefrom in the form of ions which escape across the porous membrane.

This is in accordance with well known scientific theory. The protein-containing fluid contains a fixed concentration of certain salts. In solution, these salts form charged ions. Thus, the protein-containing fluids comprises a solution containing various ions in concentration proportional to the concentration of the salts contained therein. In the channels 30, across the porous membrane, flows distilled water which contains no ions. Thus, a mass concentration gradient is set up across the membrane 22. The ions contained in channel 20 move across the pores of the membrane 22 in an attempt to establish an equilibrium condition. That is, the ions move across the membrane in an attempt to equalize the ion concentration in the channels. Fresh distilled water is continually pumped across through the channels 30 countercurrently to the protein-containing fluid. In this way the concentration gradient remains constant at a maximum, resulting in a maximum removal of salt.

It has been discovered that protein-containing fluids, which leave a dialysis unit of the type illustrated at 16, having a salt concentration measured in ionic conductivity of about 500 to 10,000 micromhos per cubic centimeter yield excellent results. Thus, salt removal which results in an ionic conductivity in this range is preferred. It should be appreciated tha typical protein-containing fluids, such as animal blood serum, normally contain sufficient salt such that its ionic conductivity is normally more than 12,000 micromhos per cubic centimeter.

It should be appreciated that although dialysis is a preferred method of salt removal, other methods which result in lowering of the salt concentration to a level approximately equivalent to that discussed above would provide the same satisfactory result. Other methods that may be used for salt removal, besides dialysis, are precipitation and chelation. In precipitation the ions are precipitated and removed as precipitated salts. In chelation, certain ions are tied up and become ineffectual in causing protein coagulation as will be described below.

The importance of the salt removal step cannot be overestimated. Although it is not proven conclusively, it is hypothesized that salt removal is a basic requirement in sterilization of protein-containing fluids especially fluids of the blood serum type. As stated above, desalting results in a lowering of the ionic conductivity. That is, the ionic concentration is lowered. Thus, salt bridge bonding is decreased if not totally eliminated. In salt bridge bonding, charged ions, attached to large protein molecules are attracted to each other. This in turn results in sticking together of the protein molecules. Therefore, the removal of salts results in a significant decrease in the sticking together of the protein molecules.

The removal of ions from a liquid has the effect of disturbing the acid-base balance in that liquid. So it is with protein-containing fluids. The removal of salts, or ions in solution, from a protein-containing fluid, usually results in acidifying the fluid. In many applications, especially where the fluid being sterilized is a biological fluid, that is, a fluid used in biological research and experimentation, it is important that the original pH of the fluid be maintained at its original level. It should be appreciated that the pH of a solution is a measure of its acidity or alkalinity. Thus, a solution with a pH of below 7 is acid, while a solution with a pH of greater than 7 is basic. A pH of 7 indicates a neutral solution. Most protein-containing solutions normally are approximately neutral, typically having a pH in the range of 6 to 8.

Returning to the desalted protein containing solution, and illustrating the phenomena discussed above with a preferred protein containing fluid, animal blood serum, the pH of desalted animal blood serum is decreased to a pH range of approximately 4 to 6.8. As stated above, protein-containing fluids, especially of the type used in biological applications, are usually maintained at their normal pH levels of about 6 to 8. This is not to say that the protein contained in the fluid is later coagulated during sterilization. It simply means that a biological fluid not maintained at its usual pH level is denatured. A biological fluid is denatural if it is cloudy, or if it does not react in a way that it is supposed to react in a biological process. For instance, uncoagulated animal blood serum, which does not provide the usable nutrition necessary for normal living cell growth therein is denatured. This important requirement of protein containing fluids is discussed in greater detail in the examples.

In order to prevent coagulation, aggregation, clouding or the like of the protein containing fluid, especially when the fluid is employed in biological work, a basic solution is added to the fluid in order to increase the fluid's pH to what it was prior to the salt removal step. Preferably, the base added should provide simple, small ions, so as to insure that the salts removed are not replaced with other ions whose effect is similar to that of the removed salts. It has been found that a base such as lithium hydroxide gives good results. Lithium hydroxide is a simple two ion salt. Alternately, other two small-ion bases such as sodium hydroxide may be used successfully. Still other bases may be used, but bases comprising two-ion salts are preferred.

It should be appreciated from the above discussion that ionic conductivity is not proportional to the pH level. Thus, the reneutralization step does not result in a conductivity nearly as high as the ionic conductivity of the fluid prior to desalting. Indeed, this is proven by the fact that the protein does not coagulate during sterilization. As stated above, sterilization of high ionic conductivity fluids usually results in protein coagulation.

The neutralized protein-containing fluid is almost ready for the sterilization step. However, in order to improve the efficiency of the sterilization procedure, in a preferred embodiment, the fluid is preheated, in a step designated 8 in FIG. 1, to a temperature in the range of about 120° F. to 180° F. More preferably, the temperature is raised to about 135° F., prior to sterilizing the protein-containing fluid. In a preferred embodiment, preheating of the ambient temperature fluid takes place in a double tube or triple tube heat exchanger with hot water flowing in the outer annular tube providing the heat medium to the fluid flowing in the inner tube.

The effectiveness of the sterilization step is increased by the preheating procedure. Thermal shocking of the fluid may cause protein coagulation. In order to prevent this possibility, the temperature is raised so that the rapid temperature increase that occurs during sterilization is somewhat reduced. This reduces the chance for thermal shock protein coagulation.

The heated protein-containing fluid is now ready for sterilization. The step of sterilization, designated as reference numeral 10 in FIG. 1, is preferably accomplished by microwave, steam or hot water energy as will be described hereinafter.

Figure 3:
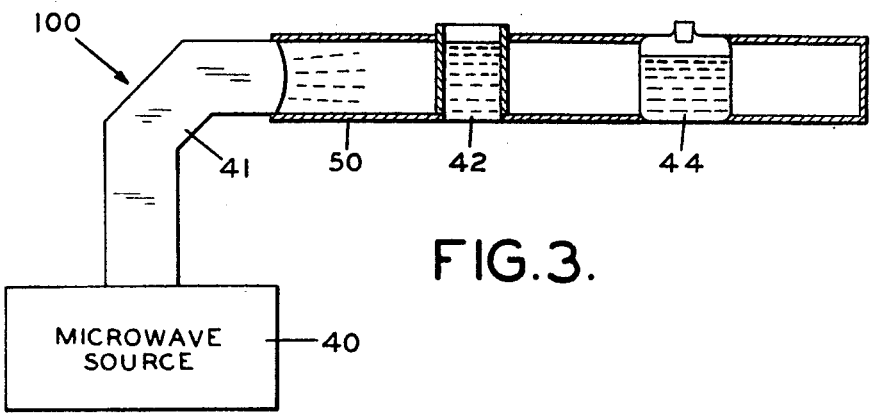
FIG. 3 is a schematic illustration of a preferred method of sterilization of protein-containing fluid according to the instant invention.
Figure 4:
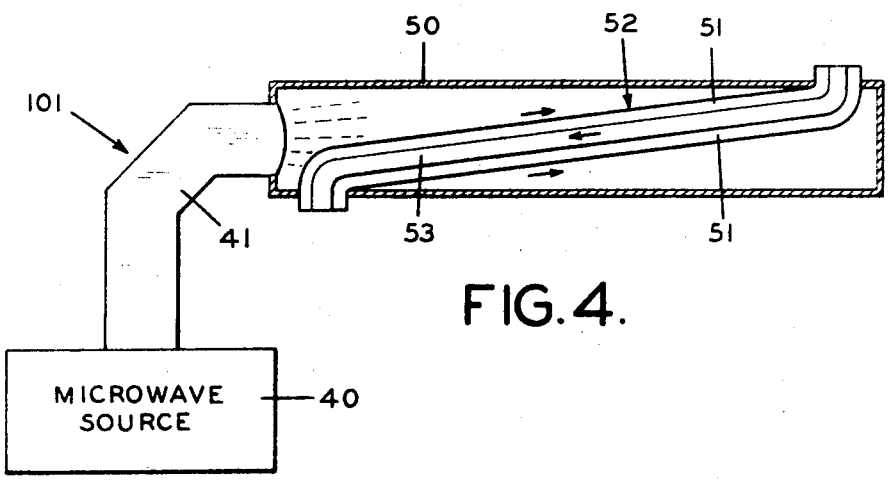
FIG. 4 is a schematic illustration of another preferred embodiment of sterilization of protein-containing fluid in accordance with the instant invention.

The preferred methods for microwave sterilization are depicted in FIGS. 3 and 4. FIG. 3 illustrates a preferred method for batch type microwave sterilization. The preferred methods for continuous protein-containing fluid sterilization are illustrated in FIG. 4.

Turning to FIG. 3 in detail, a sterilization apparatus in which microwave energy is utilized exclusively as the sterilizing medium is designated as reference numeral 100. The apparatus 100 includes a microwave source 40, such as a magnetron, coupled to a wave guide 41. The wave guide 41 directs the microwave energy generated by the microwave source 40 into an enclosed, shielded enclosure 50. The enclosure 50 is constructed of metal. Microwave energy reflects off metal surfaces so that the wave energy is retained within the compartment 50. The metal enclosure 50 provides two advantages. First, it is a safety feature, to insure against burning of workers in the vicinity of the apparatus. Secondly, the metal shielding optimizes utilization of the microwave energy.

In this second regard, it should be appreciated that microwave energy is dissipated or attenuated only by materials having high dielectric constants. Materials having low dielectric constants are considered microwave transparent, since these materials absorb little, if any, of the microwave energy. Fluids containing protein are examples of materials with high dielectric constants which absorb microwave energy and are heated. Another fluid which attenuates microwave energy is water. A third type of material, such as metals, neither transmits nor absorbs microwave energy. It reflects microwaves. Reflection of the microwave energy continues until the energy is totally attenuated. In this way, practically all the energy is absorbed by those materials in the enclosure which absorb microwave energy. In this way maximum energy is attained.

In the microwave sterilization unit 100, a container 42, filled with water, is disposed between the wave guide 41 and a container 44 filled with the protein-containing fluid to be sterilized. It should be obvious that the containers are constructed of a microwave transparent material such as nonmetallic glass, quartz, Teflon or the like. As is to be expected, the correct dosage of microwave energy to the protein-containing fluid is critical. Too small a dosage results in non-sterilization while too large a dosage will result in coagulation of the protein in the fluid.

In the preferred batch sterilization step illustrated in FIG. 3, the container of water 42 absorbs much of the microwave energy emitted by the wave guide 41. The fraction of the microwave energy not absorbed by the water moves downstream where it is absorbed by the protein-containing fluid in container 44. Enough microwave energy is provided the fluid to heat it to a temperature in the range of about 225° F. to 275° F. The sample is thereafter immediately cooled. It should be appreciated that in absence of the water shield, the fluid would rise above this optimum temperature too rapidly to be controlled, and although the fluid would be sterilized, the protein in the fluid would be coagulated.

It should be understood that the batch method has its greatest application in sterilization of biological fluids, used in biological experiments, where small quantities of specalized, sterilized biological fluids are required. For those cases where production runs are contemplated, a microwave sterilization generally indicated at 101 in FIG. 4 is preferred. Microwave assembly 101 comprises the same microwave generator 40, wave guide 41 and enclosure 50 as provided in the assembly 100. Assembly 101 differs from assembly 100 in that a double-tube heat exchanger 52 is disposed within the enclosure 50. The exchanger 52 is shaped to provide relatively large surface area energy transfer from the microwave source to the outer shell or annular orifice 51 and from the shell 52 to the inner tube 53. The exchanger 52 is constructed of a microwave transparent material such as glass.

Microwave apparatus 101 can be employed to provide two different continuous microwave sterilization procedures. In the first, a coolant fluid flows in the shell side 51 of the double pipe exchanger 52 preferably countercurrently to the protein-containing fluid stream, which flows in the inner tube 53. Alternatively, in the second procedure, the fluid stream to be sterilized, flows in the outer tube 51 while the coolant fluid flows in the inner tube 53, again, preferably countercurrently to the flow of the fluid stream. Shell side (outer tube) coolant flow is preferred in those applications where denaturation is critical. In those cases where even a slight overdose of microwave energy destroys the protein-containing fluid's usefulness, such as in certain biological fluids, water is disposed in the outer tube 51. In this way much of the microwave energy is attenuated by the water resulting in relatively slow heating of the protein-containing fluid. Shell side protein-fluid flow is preferred in those cases where more strenuous heating is required for sterilization. Even with protein-containing fluid in the outer tube 51, microwave exposure is much less marked than if there were no water flowing in the inner tube 53. Microwaves move in straight parallel paths from the wave guide 41. Thus, the waves are attenuated, not only by the fluid to be sterilized, but also by the water flowing in the inner tube before again being absorbed by the fluid disposed in the shell side. In the case where the fluid to be sterilized flows in the outer tube, further precautions can be taken in order to prevent one portion of the fluid from being overexposed, while the other portion flowing in the annular space 51 away from the wave guide 41 is underexposed. Where further precautions are taken, means (not shown) are provided to rotate the exchanger 52 or the fluid contained therein. The means provided are standard and there is no need to describe these means in detail.

Just as in the case of the batch operation, the fluid-containing protein is exposed to sufficient microwave energy to raise its temperature from about 120° F. to 180° F. to a temperature range in excess of 250° F. Protein-containing fluids heated to a temperature in this range, by means of microwave energy, are sterilized.

The sterilization step 10 may be alternately be accomplished by steam heating. Steam sterilization differs from microwave sterilization in that in steam sterilization, steam is actually added to the protein-containing fluid. Thus, in steam sterilization a second material (water) is added to the protein-containing fluid.

Figure 5:
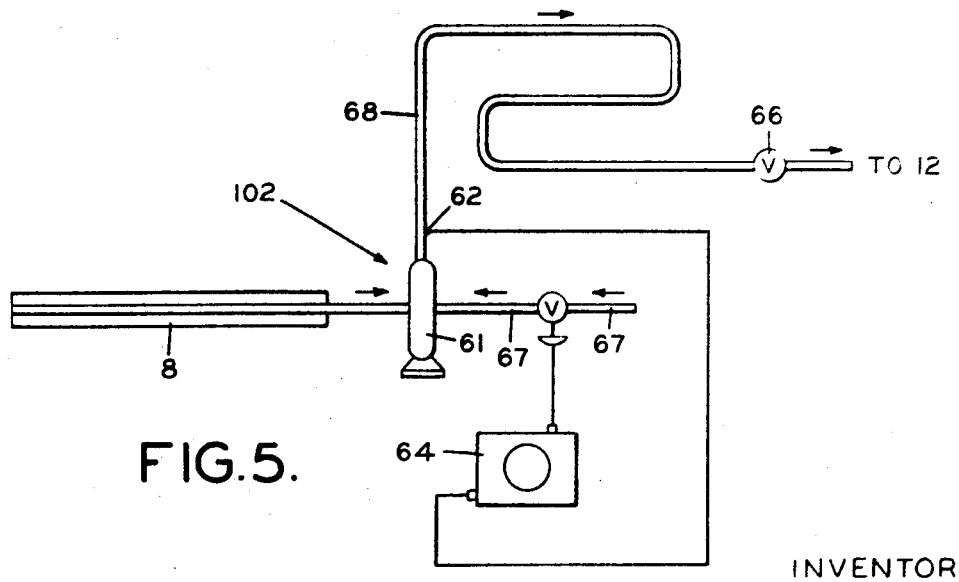
FIG. 5 is a schematic illustration of yet another preferred method of sterilization of protein-containing fluid in accordance with the instant invention.

A preferred steam sterilization assembly, generally indicated at 102, is depicted in FIG. 5. Assembly 102 includes, for the purpose of clarity, the preheater assembly 8. A protein-containing fluid leaves assembly 8 at a temperature in the range of about 120° F. to 180° F. and enters the inlet end of a mixing pump 61. A conduit 67 is also in communication with the suction end of the mixing pump 61. High pressure steam, which in a preferred embodiment is at a pressure of about 70 to 80 p.s.i.g., enters the conduit 67 (source not shown). The pressure of the steam may be reduced by a throttling valve 63, disposed in conduit 67, if this is desired. The steam, at a pressure dictated by the valve 63, mixes with the protein-containing fluid in the pump 61. The temperature of the protein-containing fluid-steam is controlled by an instrument control system which comprises the throttling valve 63, a sensor 62 and a controller 64. It is this system that controls the temperature of the steam through its control of the throttling valve 63.

Two methods of steam sterilization are provided by the assembly 102. Steam sterilization may be accomplished by the high temperature, short time method or by a method which requires longer residence times. Whether sterilization occurs by the short-time (direct steam) method or the longer time (wet steam) method is a function of the pressure maintained in the sterilizing zone. The sterilizing zone is defined by a tube 68 which extends from the discharge end of the pump 61 to a back pressure valve 66. If the pressure in the sterilizing zone is equal to or greater than the pressure of the entering steam, short-time sterilization results. In turn, the pressure in the sterilization zone is a function of the setting on the back pressure valve 66.

In short-time sterilization the valve 66 is set so that the pressure in tube 68 is significantly lower than the pressure of the steam exiting through the discharge end of pump 61. Thus, the steam enters the tube 68 as flashing, superheated steam. This results in two-phase turbulent flow in tube 68. In this regime, sterilization occurs quite rapidly.

In a preferred embodiment, the pressure in sterilizing tube 68 is maintained at a pressure range of about 25 to 40 p.s.i.g. and a temperature range of about 280–300° F. The protein-containing fluid is maintained at these conditions, in this preferred embodiment, for a time period of not more than 1 second.

In the wet steam sterilization method, the valve 66 is set to provide a back pressure equal to or greater than that of the pressure of the steam entering the pump 61. Thus, in a preferred embodiment, the pressure in the sterilizing tube 68 is maintained at a pressure in the range of 40 to 60 p.s.i.g. Similarly, the steam entering tube 68 through the pump 61 is throttled back to a pressure of 40 to 60 p.s.i.g. by the valve 63, with the provision that the entering steam pressure is equal or less than the pressure maintained in tube 68. Under these conditions the steam condenses at the trailing edge of the impeller of pump 61. Unlike the short-time method, sterilization occurs in tube 68 in the liquid phase only, with hot saturated water providing the heating medium. Although the temperature in the sterilizing tube 68 is again maintained at a preferred temperature of about 250° F. to 300° F., the residence time required, in a preferred embodiment, is about 10 to 30 seconds.

The sterilized protein-containing fluid, either by means of microwave, hot water, or steam heating, is immediately cooled. In a preferred embodiment, schematically illustrated at 12, the fluid is cooled in a double or triple tube heat exchanger by convective heat transfer. In the preferred embodiment, the sterilized fluid-containing protein is cooled in the exchanger to a temperature in the range of about 40° F. to 150° F. by flowing cold water countercurrently in annular opening surrounding the tube conveying fluid stream. This immediate cooling serves to prevent the flashing of the protein-containing fluid. The fluid, after sterilization, is at a temperature above its boiling temperature at atmospheric pressure. Therefore, the fluid must be immediately cooled to prevent flashing. A second reason for immediate cooling is to insure against overexposure at elevated sterilizing temperatures. As stated above, this is of great importance since overexposure can cause coagulation of protein.

In those applications where batch type sterilization occurs, the fluid is not cooled in double or triple tube heat exchangers, but rather the fluid, in its own sealed container, is cooled as a unit. After cooling, the batch sterilized fluid is ready for use, storage or shipment.

The continuously processed protein-containing fluid is immediately aseptically packaged in cans, bottles, containers or the like. This is illustrated as step 14 of the process of the instant invention.

In the case where the protein-containing fluid is human blood serum, an additional step is provided. In this step, a solution comprising a sterile solution of the natural salts of the kind removed during the desalting step, is added to the serum. This step is added for the purpose of insuring the serum will not be toxic for human use. It should be appreciated that any protein-containing fluid may be supplemented with such a sterile solution without adversely affecting the fluid.

The following examples are given for the purpose of illustrating the process of the instant invention and should not be interpreted as limiting, in any way, the scope of the process of the instant invention.

EXAMPLE 1

A fetal bovine blood serum was sterilized by first dialyzing the serum. This serum reduced in salt concentration resulted in a reduction in the ionic conductivity of the serum, as measured by a conductivity meter, to a range of 500 to 1000 micromhos per cubic centimeter. The serum, prior to dialysis, had an ionic conductivity of more than 12,000 micromhos per cubic centimeter.

The salt reduced serum was then neutralized by the addition of a solution of one normal (1 N) sodium hydroxide. The addition of sodium hydroxide was monitored with a pH meter. Sodium hydroxide solution addition ceased when the serum attained a pH in the range of 6.9 to 7.4.

The neutralized serum was preheated in containers to a temperature of 135° F., using hot fluid bath.

The preheated serum was placed in a container and disposed in a microwave assembly of the type illustrated as 100. The microwave source comprised a 2 kw. magnetron connected to 220 v. A.C. source delivering microwave energy to about 2500 megahertz. Disposed between the wave guide and the container filled with serum was a water barrier of the type illustrated at 42. Microwave energy was delivered to the serum until its temperature reached the range of 260° F.–270° F. The serum was immediately cooled in a cold water bath to 110° F.

The sterilized serum was allowed to cool to room temperature. The serum was clear and the protein fraction was non-coagulated. The serum was used as a nutrient for living cells. The cells grew normally in this environment.

EXAMPLE 2

Another sample of the same fetal bovine blood serum was sterilized in the same manner as in Example 1 except that the neutralization step was omitted. Thus, the sterilized serum was mildly acidic with a pH of about 4 to 6. The sterilized serum appeared cloudy. The protein in the serum, however, was non-coagulated. The serum was tested for cell growth. The living cells disposed into this serum grew. Although the protein was non-coagulated, and cell growth was maintained, cloudy serum is considered denatured and cannot be used in biological experimentation.

EXAMPLE 3

A third sample of the same fetal bovine blood serum was sterilized in the same manner as in Example 1 except that instead of neutralizing with a basic solution, an acid solution was added to lower the pH, so that the serum was strongly acidic. The resultant sterilized serum was clear and the protein non-coagulated. However, this sample resulted in abnormal cell growth.

EXAMPLE 4

A fourth sample of the same fetal bovine blood serum used in Example 1 was sterilized by the same method described in Example 1 except that more 1 N sodium hydroxide solution was added than in Example 1. Thus, the serum was basic with a pH in excess of 7. The sterilized serum was clear and non-coagulated. The cell growth tests, however, were unsatisfactory. In some cases, cells would not grow in the serum. In other cases, cell growth was reduced below normal cell growth. When the pH was raised above 9, cell growth ceased due to the toxic effect of the alkalinity of the serum.

EXAMPLE 5

A sample of fetal bovine blood serum was sterilized by the method described in Example 1 except that short-time steam sterilization was employed in place of microwave sterilization. The preheated serum, which previously was dialyzed and neutralized, was mixed in a steam injection pump with steam at a pressure of 75 p.s.i.g. The pressure in the sterilizing tube was maintained at 30 p.s.i.g. by suitable adjustment of the back pressure valve. The flashing stream resulted in a two-phase turbulent mixture in the sterilizing tube. The serum was subjected to this sterilizing regime for 0.1 second. The temperature in the sterilizing tube was held at 280° F.

The serum, after sterilization, was clear and the protein fraction uncoagulated. The serum was successfully employed to grow living cells.

EXAMPLE 6

A sample of fetal bovine blood serum was sterilized by the method described in Example 1 except that another steam type of sterilization was substituted for the microwave sterilization of Example 1. In this example, the serum was pumped into a sterilizing tube maintained, by suitable adjustment of the back pressure valve, at a pressure of 50 p.s.i.g. Steam at a pressure of 75 p.s.i.g. was supplied to a conduit in communication with the same pump which injects serum into the sterilizing tube. A throttling valve in steam inlet conduit was automatically adjusted to reduce the steam pressure entering the pump to 50 p.s.i.g. The combined stream exiting into the sterilizing tube at the discharge end of the pump was a liquid. The temperature of the liquid in the sterilizing tube was maintained at 280° F. The residence time of the liquid in the tube was 16 seconds.

The protein in the serum, after sterilization, was uncoagulated and appeared clear. The serum was successfully employed as a growing medium for living cells. The cells grew normally.

The above described invention has been described in detail, with particular reference to preferred embodiments and examples, such as the references to fetal bovine and human blood serum. However, it should be appreciated that other embodiments and examples, such as the use of other protein-containing materials, for example, hog blood serum, blood plasma, and heat labile medications are within the scope of the invention as defined by the appended claims.

EXAMPLE 7

A sample of human blood serum was sterilized by the method described in Example 1.

The sterilized human serum was clear, and the protein fraction was non-coagulated. The serum was used as a nutrient for living cells. The cells grew normally.

EXAMPLE 8

A sample of human blood serum was sterilized by the method described in Example 5.

The sterilized human serum was clear, and the protein fraction was non-coagulated. The human serum was used as a nutrient for living cells. The cells grew normally.

EXAMPLE 9

A sample of human blood serum was sterilized by the method described in Example 6.

The sterilized human serum was clear, and the protein fraction was non-coagulated. The human serum was used as a nutrient for living cells. The cells grew normally.

EXAMPLE 10

A sample of human blood serum was sterilized by the method described in Example 1 with the additional step of adding a solution comprising the natural salts normally found in human serum after the serum was sterilized and cooled to room temperature.

The sterilized human serum, to which the salt solution was added, was clear and the protein fraction thereof was uncoagulated.

EXAMPLE 11

A sample of human blood serum was sterilized by the method described in Example 5 with the additional step of adding a solution comprising the natural salts normally found in human blood serum after the serum was sterilized and cooled to room temperature.

The sterilized human serum, to which the salt solution was added, was clear and the protein fraction thereof was uncoagulated.

EXAMPLE 12

A sample of human blood serum was sterilized by the method described in Example 6 with the additional step of adding a solution comprising the natural salts normally found in human blood serum after the serum was sterilized and cooled to room temperature.

The sterilized human serum, to which the salt solution was added, was clear and the protein fraction thereof was uncoagulated.

What is claimed is:

1. A process for sterilizing a protein-containing fluid without coagulating said protein comprising the steps of:
   removing most of the salts contained in said fluid, whereby the fluid is acidified;
   neutralizing said fluid;
   exposing said fluid to temperatures in excess of 250° F. whereby the fluid is sterilized without coagulating the protein contained in said fluid.

2. A process in accordance with claim 1, including the step of preheating said neutralized fluid prior to exposing said fluid to temperatures in excess of 250° F.

3. A process in accordance with claim 1, including the step of immediately cooling said fluid after said fluid is sterilized.

4. A process in accordance with claim 1 wherein said step of exposing said fluid to temperature in excess of 250° F. comprises exposing said fluid to microwave energy whereby said fluid is heated to a temperature in the range of about 255° F. to 275° F.

5. A process in accordance with claim 1 wherein said step of exposing said fluid to temperature in excess of 250° F. comprises mixing said fluid with superheated steam whereby the fluid is heated to a temperature in the range of about 280° F. to 300° F.

6. A process in accordance with claim 1 wherein said step of exposing said fluid to temperature in excess of 250° F. comprises mixing said fluid with high pressure hot water whereby the fluid is heated to a temperature in the range of about 280° F. to 300° F.

7. A process for sterilizing a protein-containing fluid without coagulating said protein comprising the steps of:
   reducing the salt content of said fluid whereby the pH of said fluid is reduced;
   adding a basic solution to said desalted fluid until the pH of said solution is raised to its original value;
   heating said desalted fluid, to a sterilizing temperature range of about 280° F. to 300° F. by mixing said fluid with an inert fluid selected from the group consisting of water and steam, whereby said protein-containing fluid is sterilized without coagulating the protein contained therein.

8. A process in accordance with claim 7, including the step of preheating said protein-containing fluid to a temperature in the range of about 120° F. to 180° F. prior to heating said fluid to a temperature in the range of about 280° F. to 300° F.

9. A process in accordance with claim 7 including the step of cooling said fluid to a temperature in the range of about 90° F. to 150° F. immediately after said fluid is heated to a temperature in the range of about 280° F. to 300° F.

10. A process in accordance with claim 7 wherein the step of heat sterilizing said protein-containing fluid comprises:
    mixing a stream of high pressure steam with said protein-containing fluid stream;
    injecting said combined stream into a sterilizing zone maintained at a pressure markedly below that of said high pressure stream, whereby a two-phase liquid-gas stream at a temperature in the range of about 280° F. to 300° F. is formed;
    holding said two-phase stream in said sterilizing zone for a period of not more than 1 second.

11. A process in accordance with claim 10 wherein said steam is mixed with said protein containing fluid at a pressure in the range of about 70 to 80 p.s.i.g. and said steam and said fluid are injected into a sterilizing zone, maintained at a pressure in the range of about 25 to 35 p.s.i.g., whereby said steam becomes superheated.

12. A process in accordance with claim 7 wherein the step of heat sterilizing said protein-containing fluid comprises the steps of:
    mixing a stream of high pressure steam with said protein containing fluid;
    injecting said combined stream into a sterilizing zone maintained at a pressure equal to or greater than the pressure of said high pressure steam whereby said steam condenses and the combined stream enters said zone as a single phase liquid at a temperature in the range of about 280° F. to 300° F.;
    holding said liquid stream in said sterilizing zone for a period of about 10 to 20 seconds.

13. A process in accordance with claim 12 wherein both the pressure of said steam mixed with said protein-containing fluid and the pressure of said sterilizing zone are both in the range of about 40 to 60 p.s.i.g.

14. A process for sterilizing a protein-containing fluid without coagulating said protein comprising the steps of:
reducing salts of the said fluid whereby the pH of said fluid is lowered;
increasing the pH of said fluid to its original value by the addition of a basic solution;
heating said desalted protein-containing fluid to a temperature in the range of about 255° F. to 275° F. with microwave energy whereby said protein-containing fluid is sterilized without coagulating said protein.

15. A process in accordance with claim 14, including the step of preheating said protein-containing fluid to a temperature in the range of about 120° F. to 180° F. prior to subjecting said fluid to microwave energy.

16. A process in accordance with claim 14 wherein the step of microwave sterilization of said protein-containing fluid comprises exposing said protein-containing fluid to microwave energy after said microwave energy is attenuated by a microwave absorbing shield.

17. A process in accordance with claim 16 wherein said microwave absorbing shield is water.

18. A process in accordance with claim 14 wherein said protein-containing fluid is sterilized in a microwave shielded enclosure by microwave energy by the steps of:
disposing said fluid, in a microwave transparent container, in said shielded enclosure, opposite a microwave generating source emitting microwave energy;
disposing a microwave absorbing material between said fluid in said container and said microwave energy source;
sterilizing said fluid with microwave energy, emitted by said generating source, attenuated by said microwave absorbing material.

19. A process in accordance with claim 14 wherein said protein-containing fluid is sterilized by microwave energy by flowing said fluid in the inner tube of a microwave transparent double-pipe heat exchanger, said exchanger disposed in a microwave shielded enclosure, and exposed to a microwave generating source, wherein said microwave energy reaches said fluid attenuated by water which flows in the outer tube of said double-pipe exchanger.

20. A process in accordance with claim 14 wherein said protein-containing fluid is sterilized by microwave energy by flowing in the outer tube of a revolving microwave transparent double-pipe heat exchanger, said exchanger disposed in a microwave shielded enclosure, and exposed to a microwave generating source wherein said microwave energy reaches said fluid attenuated by water which flows in the inner tube of said double-pipe exchanger.

21. A process for sterilizing a biological fluid without coagulating the protein fraction thereof, comprising the steps of:
dialyzing said fluid to remove most of the salts contained therein, whereby the fluid is acidified;
adding a basic solution to said fluid to increase the pH of said fluid, to a pH of approximately 7, whereby said fluid is neutralized; and
sterilizing said biological fluid by exposing said neutralized fluid to an energy source whereby the temperature of said fluid is raised to a range of about 255° F. to 300° F. whereby said fluid is sterilized without coagulating the protein fraction thereof.

22. A process in accordance with claim 21 wherein said biological fluid is human blood serum.

23. A process in accordance with claim 21 wherein said biological fluid is animal blood serum.

24. A process in accordance with claim 23 wherein said dialyzing step causes a reduction of the ionic conductivity of said serum from a range in excess of 12,000 micromhos per cubic centimeter to range of about 500 to 10,000 micromhos per cubic centimeter.

25. A process in accordance with claim 23 wherein said animal blood serum is fetal bovine blood serum.

26. A process in accordance with claim 23 wherein the step of neutralizing said serum comprises the addition of a basic hydroxide solution to bring the pH of said serum up to a range of about 6.9 to 7.4.

27. A process in accordance with claim 26 wherein said basic solution is lithium hydroxide.

28. A process in accordance with claim 26 wherein said basic solution is sodium hydroxide.

29. A process for sterilizing a biological fluid without coagulating the protein fraction thereof, comprising the steps of:
dialyzing said fluid to remove most of the salt content thereof, whereby the fluid is acidified;
adding a basic solution to acidified fluid to increase the pH of said fluid to the level present prior to said dialysis step;
sterilizing said fluid by exposing said neutralized fluid to an energy source whereby the temperature of said fluid is raised to a temperature in excess of 250° F. whereby said fluid is sterilized;
cooling said sterilized fluid; and
adding a solution comprising the natural salts normally found in said fluid.

30. A process in accordance with claim 29 wherein said energy source is microwave energy.

31. A process in accordance with claim 29 wherein said energy source is superheated steam.

32. A process in accordance with claim 29 wherein said energy source is saturated water.

33. A product produced by the process of claim 1.

34. A product in accordance with claim 33 wherein the fluid is a biological fluid.

35. A product in accordance with claim 33 wherein said fluid is animal blood serum.

36. A product in accordance with claim 33 wherein the fluid is human blood serum.

37. A product in accordance with claim 33 wherein the fluid is blood plasma.

References Cited

UNITED STATES PATENTS

| 1,556,120 | 10/1925 | Mills | 424—101 X |
|---|---|---|---|
| 3,579,631 | 5/1971 | Stewart et al. | 21—56 X |
| 1,468,313 | 9/1923 | Lux | 260—112 B X |
| 2,833,691 | 5/1958 | Klaas | 260—112 B X |
| 2,897,123 | 7/1959 | Singher | 424—101 X |
| 3,284,301 | 11/1966 | Schor | 424—101 X |
| 2,625,488 | 1/1953 | Wasserman et al. | 99—216 |
| 3,489,647 | 1/1970 | Kolobow | 424—101 X |

FOREIGN PATENTS 913,519   12/1962   Great Britain.

OTHER REFERENCES

"Blood Cells and Plasma Proteins," J. L. Tullis, 1953, pp. 61–66 (QP/91/T9).

MORRIS O. WOLK, Primary Examiner

D. G. MILLMAN, Assistant Examiner

U.S. Cl. X.R.

21—2, 54 R, 56; 99—216, 217; 260—112 B